May 19, 1959

E. P. HAMILTON 2,887,676

PULSE INTERPRETER

Original Filed Sept. 27, 1954

FIG_1_

FIG_2_

FIG_3_

FIG_4_

FIG_5_

FIG_6_

INVENTOR.
Eugene P. Hamilton.
BY
Robert W. Hampton
ATTORNEY

May 19, 1959     E. P. HAMILTON     2,887,676
PULSE INTERPRETER

Original Filed Sept. 27, 1954     8 Sheets-Sheet 2

FIG_7_

FIG_8_

FIG_9_

FIG_10_

FIG_11_

FIG_12_

FIG_13_

FIG_14_

INVENTOR.
Eugene P. Hamilton.
BY
Robert W. Hampton
ATTORNEY

May 19, 1959  E. P. HAMILTON  2,887,676
PULSE INTERPRETER
Original Filed Sept. 27, 1954  8 Sheets-Sheet 3

FIG_15_

FIG_16_

FIG_17

FIG_18

FIG_19_

FIG_20_

INVENTOR.
Eugene P. Hamilton.
BY
Robert W. Hampton
ATTORNEY

May 19, 1959 E. P. HAMILTON 2,887,676
PULSE INTERPRETER

Original Filed Sept. 27, 1954

FIG_21_

FIG_22_

FIG_23_

FIG_24_

INVENTOR.
Eugene P. Hamilton.
BY
Robert W. Hampton
ATTORNEY

May 19, 1959     E. P. HAMILTON     2,887,676
PULSE INTERPRETER Original Filed Sept. 27, 1954     8 Sheets-Sheet 6

FIG_26_

FIG_27_

INVENTOR.
Eugene P. Hamilton.
BY
Robert W. Hampton
ATTORNEY

United States Patent Office 2,887,676
Patented May 19, 1959

2,887,676
PULSE INTERPRETER

Eugene P. Hamilton, Richmond, Calif., assignor to Marchant Research, Inc., a corporation of California Original application September 27, 1954, Serial No. 458,473. Divided and this application May 9, 1956, Serial No. 583,847

8 Claims. (Cl. 340—174)

This invention, which is a division of application Serial No. 458,473, filed September 27, 1954, by George B. Greene et al., relates to computers, and more particularly concerns a pulse interpreter in an electronic computer.

In computers which store large quantities of information, for example in a magnetic drum or tape "memory," certain modes of data storage give rise to problems in interpreting signals that are produced when stored information is read out of the memory unit.

The present invention is illustrated in the environment of a digital computer which employs a magnetic drum memory on which information is stored in the well-known "non-restore-to-zero" mode as binary 0's and 1's representations, described in detail hereinafter. The patterns of 0's and 1's stored in this memory is purely a function of the information represented thereby, and the "non-restore-to-zero" mode of storage, in combination with a random 0's and 1's distribution, produces a series of random dwells in one or another magnetized state on the drum surface. For reasons described hereinafter, such an arrangement often leads to readout signals that are nonuniform in amplitude and width. These signals must be accurately identified with respect to time position in order to assign them their proper ordinal significance.

It is therefore a primary object of the present invention to provide an improved circuit for interpreting signals that are derived from a magnetic memory having values recorded thereon in random order.

It is another object of the invention to interpret signals, representing randomly time-spaced value changes, by detecting the properties of each signal at a plurality of times during the signal, and relating the signal to an appropriate one of several predetermined time intervals in response to such detection.

Other objects of the invention will appear from the following description, reference being made to the accompanying drawings, in which:

Fig. 28 is a block diagram of the Clock Pulse Generator and Clock Pulse Distributor;

Although the following description of a specific embodiment of the invention often refers to exact values, as regards numbers of stages in a register, pulse repetition rates and the like, it is to be understood that these values are merely illustrative. Such values may be varied, thereby adapting the invention to specific requirements, without departing from the scope of the invention.

NUMBER SYSTEM

The computer, some of whose circuits are hereinafter described, is a digital computer, as opposed to an analog computer, i.e., it processes and stores representations of discrete digital values. These values are expressed, in the computer, in various representations of the conventional binary system of notation. The conventional binary system employs only the digits 0 and 1, any ordinal digit 0 having an equivalent decimal value of 0 and any ordinal digit 1 having an equivalent decimal value of $2^{n-1}$, where $n$ is the order number. For ease of understanding, binary values stored or processed in the computer will often be referred to as their decimal equivalents in the following description.

BINARY VALUE REPRESENTATIONS

Binary values are represented in the present computor in any of three forms. A first form is employed on the Memory Drum, on which a selected area of a continuous magnetic medium is saturated in one direction of magnetization to represent a digit 0 and in the opposite direction to represent a digit 1. A multidigit binary number is represented by a series of such areas. All of the magnetized areas that are employed to represent a given multidigit number are successively contiguous; therefore, a change in the direction of magnetization occurs only where there is a change in value as between two successive digits.

A second form of value representation is employed in the Reading Amplifiers, wherein a positive pulse represents a change in digital value from 0 to 1, as between two successive digits, and a negative pulse represents a change in digital value from 1 to 0. Obviously, the polarities of these two pulses may be reversed, as long as they remain opposite each other.

A third form of value representation is employed in the Transfer Busses wherein a pulse on a first bus represents a 0 and a pulse on a second bus represents a 1. These pulses may be either positive or negative, depending on the polarity of pulses required for operating a particular computer circuit.

For convenience of description, the pulses which represent individual binary digits, and the groups of pulses which represent multidigit binary numbers, will often be referred to hereinafter as the respective digits or multidigit numbers themselves.

SERIES OPERATION

The digital computer which embodies the present invention is primarily a "serial" computer, i.e., successive digits of a multidigit binary number are expressed seriatim while they are being transferred between circuit units of the computer.

TIMING

The computer which employs the present invention is timed by a special Memory section which is designated the "Clock Track," and which generates periodic timing signals. These signals ultimately control a Clock Pulse Distributor which, along with the Clock Track of Memory, will be described in detail hereinafter. The output of the Clock Pulse Distributor comprises four sequential control pulses, designated "CP–1," "CP–2," "CP–3" and "CP–4," respectively, followed by a train of twenty-six pulses, designated "operating pulses" or "OP's." The pulse pattern of four CP's followed by twenty-six OP's is repeated cyclically throughout the computer operation. Each of the four CP's is transmitted on a separate output lead from the Clock Pulse Distributor to the various computer circuits which require a control pulse at that time for any of a number of control operations, described hereinafter. Each train of OP's is transmitted on a fifth output lead from the Clock Pulse Distributor to various computer circuits for causing shifting operations or the like. The successive pulses in a train of OP's may be gated to represent the respective digits of a multidigit binary number, in which case the resulting number contains twenty-six digits and is designated a "word."

The time interval between two successive digits of a word is designated a "digit interval," and has a duration of approximately five microseconds. Because of several delay circuits employed in the present invention, a pulse representing a digit may occur at any time during its related digit interval. The expression "word interval" will be used to designate a time period embracing the thirty digit intervals which include each set of four CP's and the related train of twenty-six OP's.

CIRCUIT ELEMENTS

In general

The following circuit elements are intended to illustrate the types of basic elements which are employed as "building blocks" in the present invention. The specific elements shown and described are by no means the only ones of their types that can be incorporated successfully into the circuits described, but each element described has been found to operate reliably in the circuits where it is used.

Triode amplifier

Figures 1, 2:
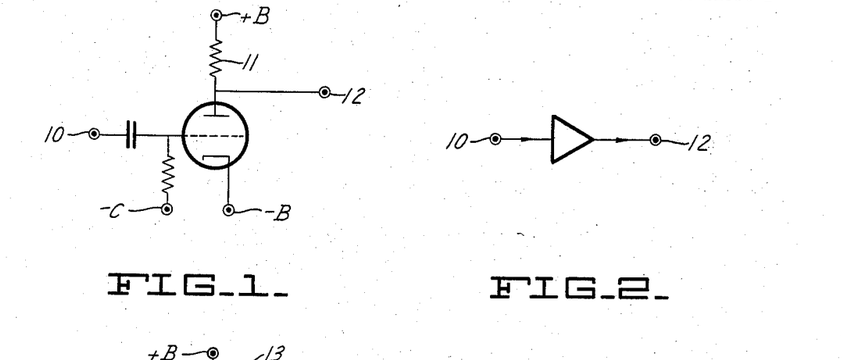
Fig. 1 is a schematic diagram of a typical triode amplifier.
Fig. 2 is a block diagram employed to represent the triode amplifier shown in Fig. 1.
Figure 2A:
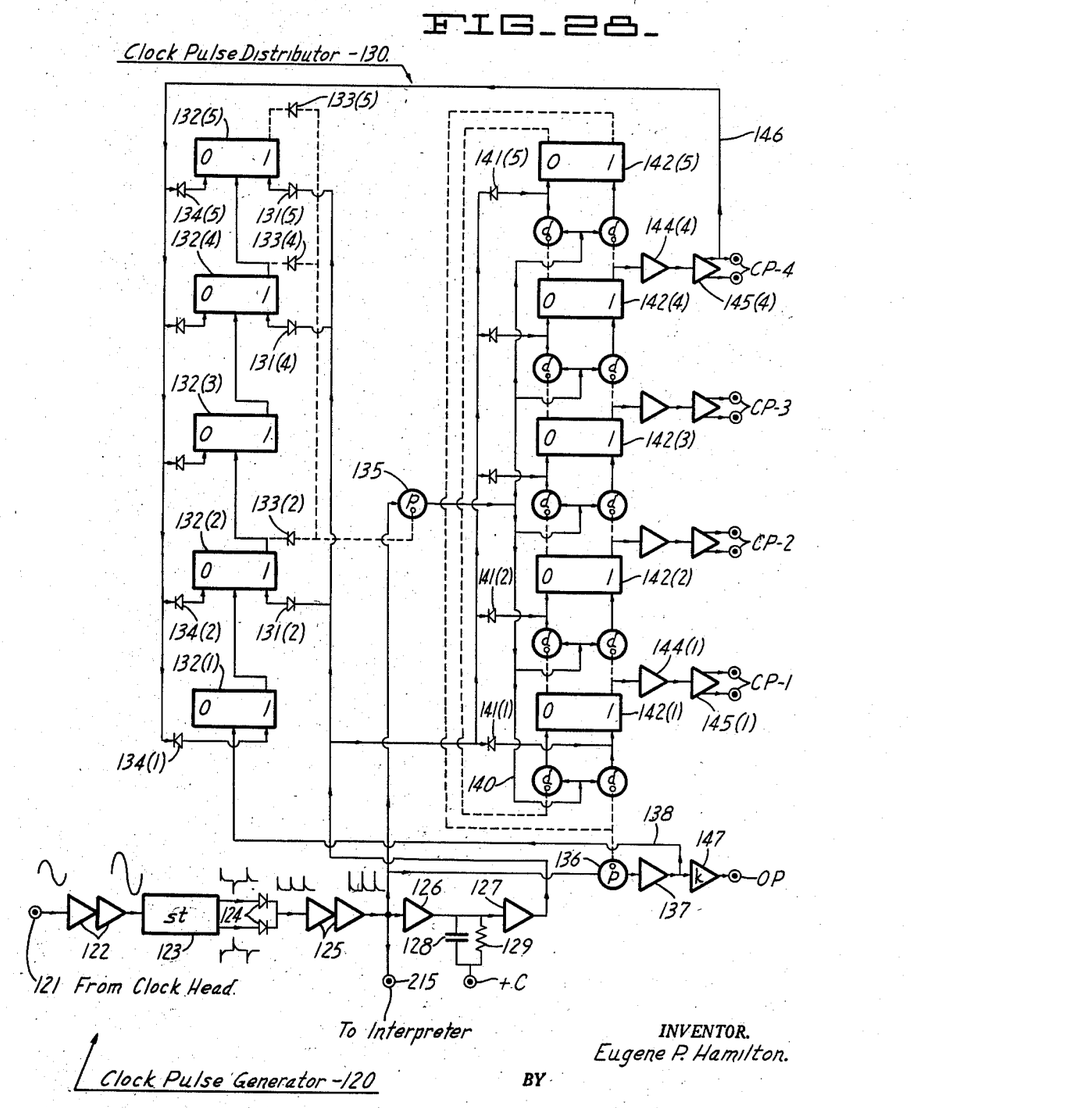

One of the circuit elements employed in the present invention is a triode amplifier, an example of which is shown in Fig. 1. Input signals are applied to the grid of the amplifier through a terminal 10. The grid is connected through a terminal —C to a source of bias potential. The potential of terminal —C can be chosen low enough to normally bias the tube below cutoff for class B or class C operation in which case only positive input pulses are amplified. Alternatively, the potential of terminal —C can be chosen high enough to normally bias the tube to conduction for class A operation, in which case both positive and negative input pulses are amplified. Output signals from the amplifier are derived across a resistive anode impedance 11 through an output terminal 12. It is well known that the output signal from such an amplifier is reversed in polarity from the input signal. Fig. 2 illustrates the block representation of the triode amplifier, as shown in the accompanying drawings.

Phase inverter

Figures 3, 4:
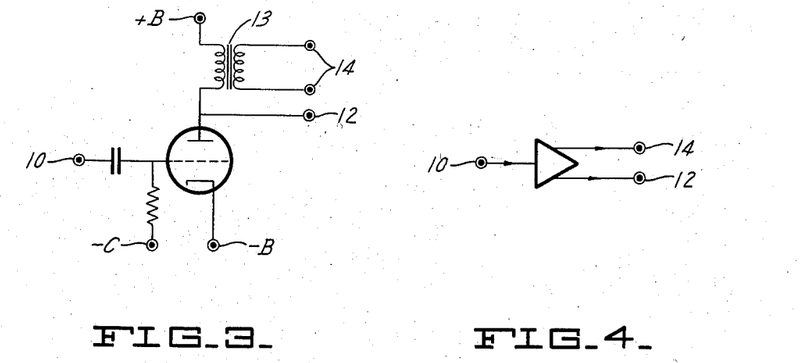
Fig. 3 is a schematic diagram of a typical phase inverter.
Fig. 4 is a block diagram representing the phase inverter of Fig. 3.

A modification of the triode amplifier is a phase inverter, an example of which is shown in Fig. 3. The phase inverter is identical to the triode amplifier except that its output signals are taken from a pair of terminals 14 which are connected to opposite ends of the secondary winding of a transformer 13. The primary winding of transformer 13 constitutes the anode impedance of the triode. By connecting a selected one of the terminals 14 to a reference potential, the remaining terminal 14 may be employed for delivering an output signal either of the same polarity as the input signal or of opposite polarity, depending upon which terminal 14 is connected to the reference potential. If a terminal 14 is used for delivering a signal of the same polarity as the input signal, a terminal 12 connected directly to the anode may be used for delivering an output signal of opposite polarity. Alternatively, the secondary winding of transformer 13 may be center-tapped to a reference potential, and both terminals 14 may then be employed, thereby providing two output signals of opposite polarity. Fig. 4 illustrates a block diagram of the phase inverter as shown in the accompanying drawings.

Cathode follower

Figures 5, 6:
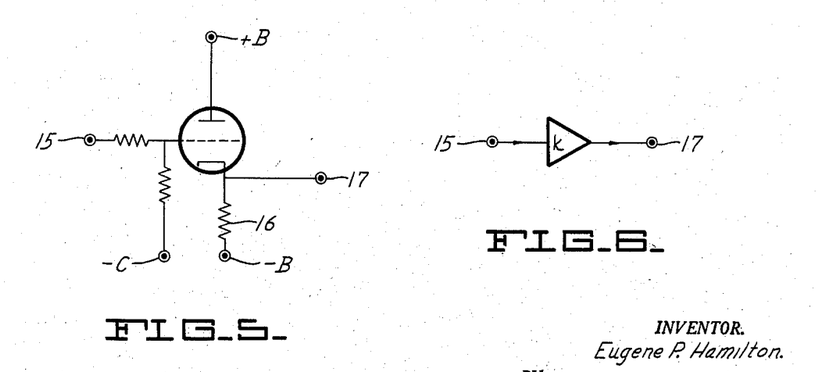
Fig. 5 is a schematic diagram of a typical cathode follower.
Fig. 6 is a block diagram representing the cathode follower of Fig. 5.

A further circuit element employed in the present invention is a cathode follower, an example of which is shown in Fig. 5. The cathode follower is a triode current amplifier which receives input signals applied to its grid through an input terminal 15, and which delivers output signals, in phase with the input signals, across a cathode impedance 16. The cathode follower, like the triode amplifier, can be biased for either class A operation or for class B or C operation, depending on the value of a bias potential which may be applied to the grid through a terminal —C. Fig. 6 illustrates the block diagram of the cathode follower as shown in the accompanying drawings.

Diode gate

Figure 7:
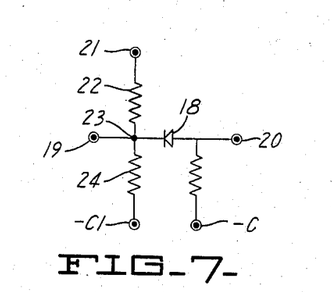
Fig. 7 is a schematic diagram of a typical diode gate.

A first type of gating circuit employed in the present invention is a diode gate, an example of which is shown in Fig. 7. This gate includes a diode 18 which is oriented to transmit only negative pulses from an input terminal 19 to an output terminal 20. In order for a diode to transmit a negative pulse, however, the potential of its cathode must fall below the potential of its anode for the duration of the pulse. Therefore, negative input pulses may be prevented from passing through a diode by maintaining the potential of its cathode higher than that of its anode by an amount at least equal to the amplitude of the input pulses. The diode gate shown in Fig. 7 is adapted for selectively blocking or passing negative pulses by maintaining the anode of diode 18 at a fixed bias potential —C and by applying a selectively high or low bias potential to its cathode through a potential divider comprising an arming terminal 21 in series with a first resistor 22, a junction 23 connected to the cathode, a second resistor 24 and a source of bias potential —C1. A selectively high or low potential may be applied to the arming terminal 21 by any of several means, such as by connecting it to one anode of a flip-flop circuit, hereinafter described. When terminal 21 is at its high potential, junction 23 is at a potential which is sufficiently high for blocking the negative input pulses applied to terminal 19, and the diode gate is said to be "closed." When terminal 21 is at its low potential, junction 23 is at a potential which is sufficiently low for transmitting the negative input pulses, and the gate is said to be "armed."

Figure 8:
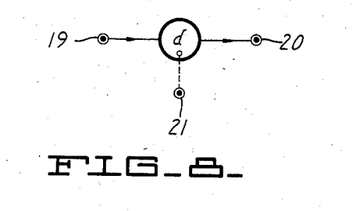
Fig. 8 is a block diagram representing the diode gate of Fig. 7.

Fig. 8 shows the block form of the diode gate as used in the accompanying circuit diagrams. In Fig. 8, as well as in the remaining block diagrams, a control lead is shown as a broken line and a pulse lead is shown as a solid line. Therefore, in Fig. 8 the arming lead connected to terminal 21 is shown as a broken line, and the input and output leads are shown as solid lines. It is noted that the diode gate, as well as the cathode follower gate hereinafter described, can be employed for gating D.C. potential levels as well as pulses. In such cases, the input and output leads are shown as broken lines in the block representations of the gates. For the purposes of the present invention, a square gating pulse of relatively long duration will be treated as an adjustable D.C. gating potential.

Triode gate

Figure 9:
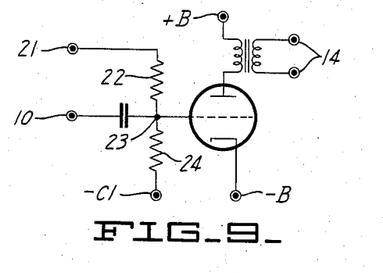
Fig. 9 is a schematic diagram of a typical triode gate.
Figure 10:
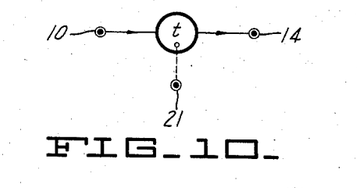
Fig. 10 is a block diagram representing the triode gate of Fig. 9.

A second type of gate employed in the invention is a triode gate, an example of which is shown in Fig. 9. This gate comprises a simple triode amplifier of the type previously described in connection with Fig. 1, having its control grid biased through the potential divider including arming terminal 21 (Fig. 9), resistor 22, junction 23, resistor 24 and terminal —C1. The triode gate is adapted to selectively pass or block positive signals applied to its input terminal 10. The bias potential —C1 and the arming potentials applied to terminal 21 are chosen such that when terminal 21 is at its low potential, the grid potential of the amplifier is below cutoff level by an amount exceeding the amplitude of the positive signals applied to terminal 10, and the gate is closed. When terminal 21 is at its high potential, the grid potential of the amplifier is slightly below cutoff, thereby arming the gate for amplifying positive signals applied to terminal 10. Fig. 10 shows the block representation of the triode gate, as employed in the accompanying circuit diagrams.

Cathode follower gate

Figure 11:
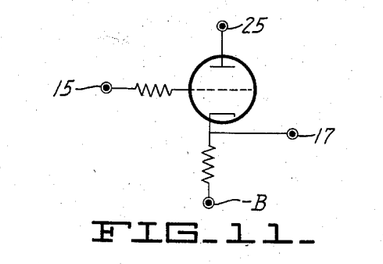
Fig. 11 is a schematic diagram of a typical cathode follower gate.
Figure 12:
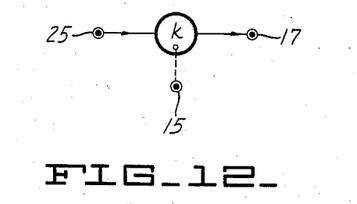
Fig. 12 is a block diagram representing the cathode follower gate of Fig. 11.

A third type of gate employed in the present invention is a cathode follower gate, an example of which is shown in Fig. 11. This gate includes a cathode follower of the type described in relation to Fig. 5. The cathode follower gate is armed or closed by a relatively high or low potential applied to its grid through terminal 15 (Fig. 11), and receives input signals applied to its anode through a terminal 25. The cathode follower conducts and produces an output signal at terminal 17 only when both input terminals 15 and 25 are at relatively high potentials. Fig. 12 illustrates the block form of the cathode follower gate, as employed in the computer circuit diagrams.

Pentode gate

Figure 13:
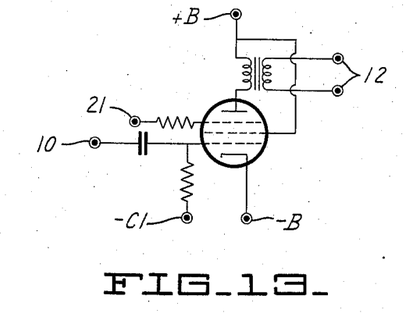
Fig. 13 is a schematic diagram of a typical pentode gate.
Figure 14:
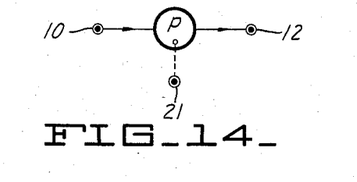
Fig. 14 is a block diagram representing the pentode gate of Fig. 13.

A fourth type of gate employed in the present invention is a pentode gate, an example of which is shown in Fig. 13. In this gate, the arming terminal 21 is connected to the suppressor grid of a pentode, and positive input pulses are applied through the input terminal 10 to the control grid. The gate is normally closed by maintaining terminal 21 at its low potential, and a positive pulse applied to terminal 10 fails to cause the pentode to conduct. On the other hand, if terminal 21 is at its high potential, the gate is armed and the positive pulse applied to terminal 10 is amplified in the pentode to produce an output signal as previously described in relation to Figs. 1 and 3. Fig. 14 illustrates the block form of pentode gate, as employed in the accompanying circuit diagrams.

"And" gate

Any of the previously described gates can be modified to form an "and" gate, which is identical to its related diode, triode or pentode gate except for the arming circuit which provides for two or more arming inputs. All of the arming inputs of the "and" gate must be at a high potential in order to arm the gate.

Figure 15:
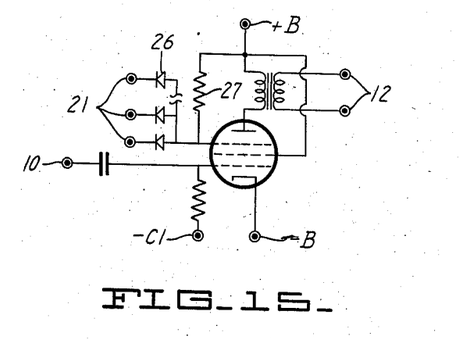
Fig. 15 is a schematic diagram of a typical "and" gate.
Figure 16:
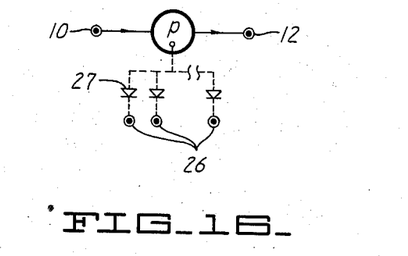
Fig. 16 is a block diagram employed to represent the "and" gate shown in Fig. 15.

Fig. 15 shows a pentode gate modified to form an "and" gate. The arming circuit has two or more input terminals 21, each of which is connected through a respective diode 26 to the suppressor grid of the pentode. The suppressor grid is connected to +B through a resistor 27; therefore, if any terminal 21 is at a low potential, it receives current through its related diode 26 and the resistor 27, thereby causing a potential drop across resistor 27. This maintains the suppressor grid at a low potential and the gate is closed. If all of the arming terminals 21 are maintained at a high potential, there is substantially no current flow through resistor 27 and the suppressor grid is at a high potential, thereby arming the gate. Fig. 16 illustrates the block diagram that is employed in the accompanying drawings to represent an "and" gate.

Delay circuit

Figure 17:
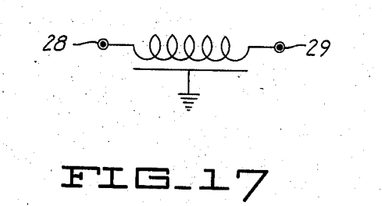
Fig. 17 is a schematic diagram of a typical delay circuit.
Figure 18:
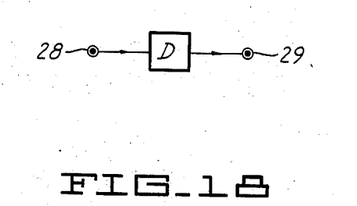
Fig. 18 is a block diagram employed to represent the delay circuit shown in Fig. 17.

A further circuit element employed in the invention is a delay circuit, an example of which is shown schematically in Fig. 17 as a distributed parameter delay line of the type disclosed in Fig. 5 of U.S. Patent No. 2,467,857, issued April 19, 1949, to J. H. Rubel, et al., to which reference is made for a full description. It is to be understood that other delay circuits, such as lumped parameter delay lines may be employed. Pulses applied to an input terminal 28 of the delay line are delayed a few microseconds or a fraction of a microsecond, and appear at an output terminal 29. The block representation of a delay circuit is shown in Fig. 18.

Bistable circuit

A further element employed in the present invention is a bistable circuit such as the well-known Eccles-Jordan trigger circuit, or "flip-flop," described in "Theory and Application of Electron Tubes," by H. J. Reich. In one of its simplest form, a flip-flop comprises two triode vacuum tubes with the grid of each tube cross-coupled to the anode of the other tube through a respective network comprising a resistor in parallel with a capacitor. One of the two tubes is always conducting while its companion tube is nonconducting, thereby providing a circuit having two stable operating states.

Figure 19:
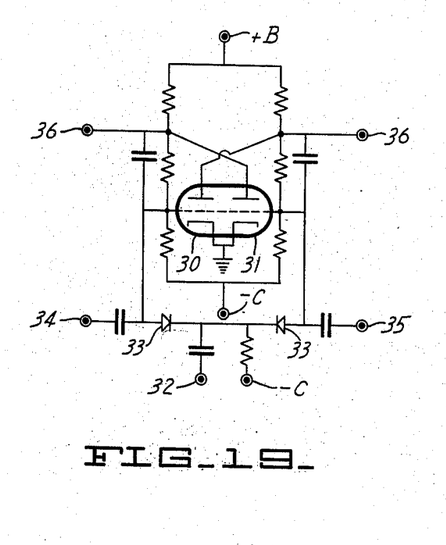
Fig. 19 is a schematic diagram of a typical flip-flop circuit.

A modification of the Eccles-Jordan circuit is shown in Fig. 19, and comprises two triodes 30 and 31, shown for convenience as the two sides of a twin triode. When the left hand section 30, hereinafter referred to as the "0 side," is conducting, the flip-flop is said to be "reset"; when the right hand section 31, hereinafter referred to as the "1 side," is conducting, the flip-flop is said to be "set." Negative pulses may be applied through a "symmetrical" input terminal 32 and a respective diode 33 to the grid of each section 30 and 31. Each symmetrically applied input pulse reverses the state of operation of the flip-flop in a manner well known in the art. If the orientation of each diode 33 is reversed, the flip-flop can be made to respond to positive, rather than negative pulses. Alternatively, an input pulse may be applied through a "set" input terminal 34 or a "reset" input terminal 35. A negative pulse through terminal 34 sets the flip-flop if it does not already stand at 1, while a negative pulse through terminal 35 resets the flip-flop if it is not already standing at 0. On the other hand, a positive pulse applied to terminal 34 or 35 causes the flip-flop to be reset or set, respectively. A diode (not shown) may be inserted in series with each terminal 34 or 35. If each such diode is oriented to transmit only negative pulses to the grid of its related flip-flop section, then terminals 34 or 35 are designated the "reset" and "set" terminals, respectively, in accordance with the previously described effects of negative pulses applied to these terminals.

The flip-flop is adapted to control or operate other devices by means of the changing potential levels on the anodes of its two sections. When the flip-flop stands at 0, the potential of the anode of section 30 is relatively low while the potential of the other anode is relatively high, the converse being true when the flip-flop stands at 1. The change of anode potentials of a flip-flop may be employed for controlling any of the previously described gates by connecting the appropriate anode of the flip-flop to the arming terminal of the gate through a flip-flop output terminal 36. It is also noted that when a flip-flop is reversed from one of its states to the other, a potential rise appears at one of its output terminals 36 and a potential drop appears at the other. These potential changes may be employed for operating other flip-flops or the like.

Figure 20:
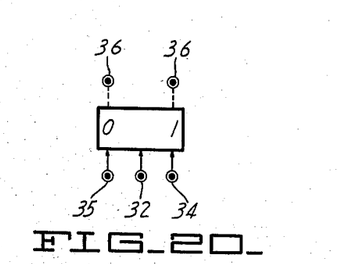
Fig. 20 is a block diagram employed to represent the flip-flop circuit shown in Fig. 19.

In the block diagrams and in the descriptions of the accompanying circuits, the following conventional is adhered to regarding the flip-flap output terminals 36: a gate which is armed by the "0 side," or through the "0 side output terminal" of a flip-flop, has its arming terminal connected to that terminal 36 whose potential is appropriate for arming the gate when the flip-flop stands at 0. A similar convention is used in relation to a gate which is armed by the "1 side," or through the "1 side output terminal" of a flip-flop. If a signal from the "0 side output terminal" is employed for operating a next flip-flop, the output signal is understood to be taken from that terminal 36 which delivers a voltage change in the appropriate direction for operating the next flip-flop when the first flip-flop is reversed from 0 to 1. A similar convention is used in relation to a flip-flop which is operated in response to a change of state, from 1 to 0, of a previous flip-flop. The block representation of a flip-flop is shown in Fig. 20.

Schmidt trigger

Figure 21:
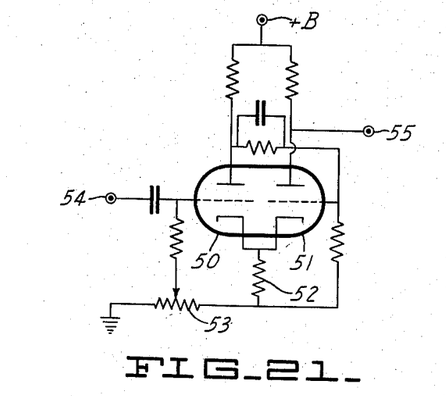
Fig. 21 is a schematic diagram of a typical Schmidt trigger.

Another element employed in the invention is a Schmidt trigger, an example of which is shown in Fig. 21. This circuit is employed as a pulse generator, and produces an output pulse having a duration which depends upon the duration of the input signal.

Figure 22:
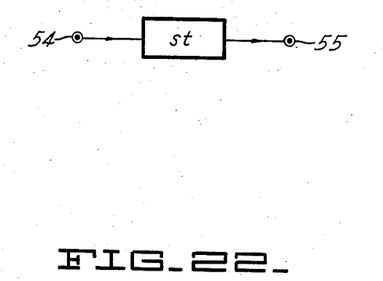
Fig. 22 is a block diagram employed to represent the Schmidt trigger shown in Fig. 21.

Referring to Fig. 21, the Schmidt trigger comprises two triode vacuum tubes 50 and 51, which are shown for convenience as the two sections of a twin triode. The anode of section 50 is cross-coupled to the grid of section 51, and both cathodes are returned to a source of reference potential through a single pair of resistors 52 and 53 arranged in series. Section 51 is normally biased to conduction, while section 50 is normally biased to nonconduction. Positive input signals are applied to the grid of section 50 through an input terminal 54. Whenever the amplitude of the input signal is sufficiently high to bias section 50 to conduction, the anode voltage of section 50 drops, thereby coupling a negative pulse to the grid of section 51 for cutting off the latter section. When the amplitude of the input signal again drops below the cutoff potential for section 50, that section is cut off and its rising anode potential causes section 51 to again conduct. The changes from conduction to nonconduction, and vice versa, of section 51 are rapid, and the anode potential of that section therefore rises and falls sharply, producing a substantially square positive pulse at an output terminal 55. The block representation of the Schmidt trigger is shown in Fig. 22.

Shift register

Figure 23:
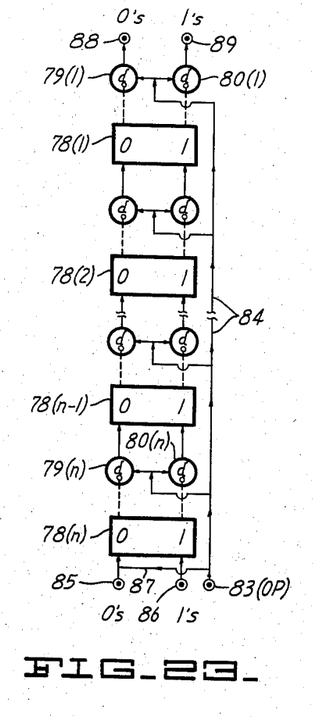
Fig. 23 is a block diagram of a typical shift register.

A further element employed in the invention is a shift register, an example of which is shown in Fig. 23. This register comprises a plurality of value-storing flip-flop stages 78(1) to 78(n), the number of stages being determined by the number of digits in the longest binary word that is to be stored in the register. The stages are arranged in the drawing with the least significant stage at the top and the most significant stage at the bottom. The register is adapted to receive a binary word, digit-by-digit, into the most significant stage, to shift the word digit-by-digit through the successively less significant stages, and to transmit the word digit-by-digit from the least significant stage to any desired unit of the computer.

Referring to Fig. 23, each flip-flop 78 controls a pair of shift gates 79 and 80. Each gate 79 is armed when its related stage stands at 0, while each gate 80 is armed when its related stage stands at 1. For shifting, consecutive OP's are applied through a terminal 83 to a shift bus 84 which transmits the OP's to the input of each shift gate 79 and 80. Each armed gate 79 or 80 transmits each OP to the next stage and sets or resets that stage accordingly. Values may be entered into the shift register from a 0's input terminal 85 and a 1's input terminal 86 which are connected, respectively, to the reset and set input terminals of the most significant stage. Alternatively, values may be entered into the register through the 1's input terminal 86 alone, in which case the shift terminal 83 is connected to the reset input of stage 78(n) by a lead 87 for resetting that stage to 0 during any digit interval in which no 1's input pulse is received at terminal 86. The word standing in the register may be shifted out of the last register stage, i.e., stage 78(1), through a 0's output terminal 88 and a 1's output terminal 89 which constitute the output terminals of the last stage shift gates 79(1) and 80(1), respectively.

Binary counter

Figure 24:
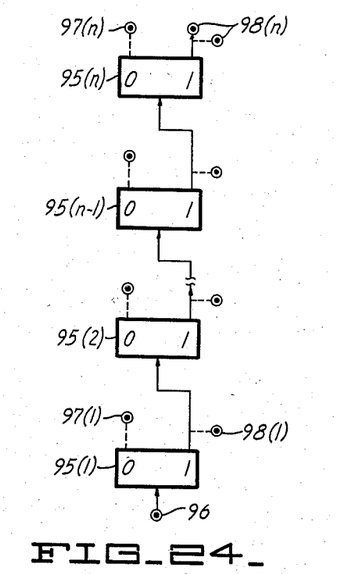
Fig. 24 is a block diagram of a typical cascade binary counter.

A final element employed in the present invention is a multi-stage binary counter, an example of which is shown in Fig. 24. The binary counter comprises a plurality of flip-flop stages 95(1) to 95(n). Input pulses are applied symmetrically to the least significant stage, i.e., stage 95(1), through a terminal 96, and each input pulse reverses stage 95(1). Each stage has a 0 side output terminal 97 and a 1 side output terminal 98 by means of which the stages are connected in binary cascade, i.e., one of the output terminals 97 or 98 of each flip-flop stage except the last is connected to the symmetrical input of the next stage. In the circuit shown in Fig. 24, the 1 side output terminal 98 of each stage is connected to the symmetrical input of the next stage; therefore, when each stage reverses from its 1 state to its 0 state, a sharp negative potential change is transmitted from that stage to the symmetrical input of the next stage, thereby reversing the state of the latter. Through this arrangement, the input pulses are counted in increasing order, and the circuit operates as an "upcount" binary counter. By connecting the 0 side output terminal 97 of each stage to the symmetrical input terminal of the next stage, the circuit can be made to operate as a "downcount" binary counter, i.e., each input pulse applied to stage 95(1) reduces by unity the value standing in the circuit. The output terminals 97 and 98 of each stage may also be employed to control gates in the manner hereinbefore described.

GENERAL DESCRIPTION

Computer sections

The computer in which the present invention is employed may be considered, for convenience of description, as comprising six principal sections, as follows:

1. Memory section;
2. Timing section;
3. Transfer section;
4. Arithmetic section;
5. Address section; and
6. Program section.

Memory section

Figure 25:
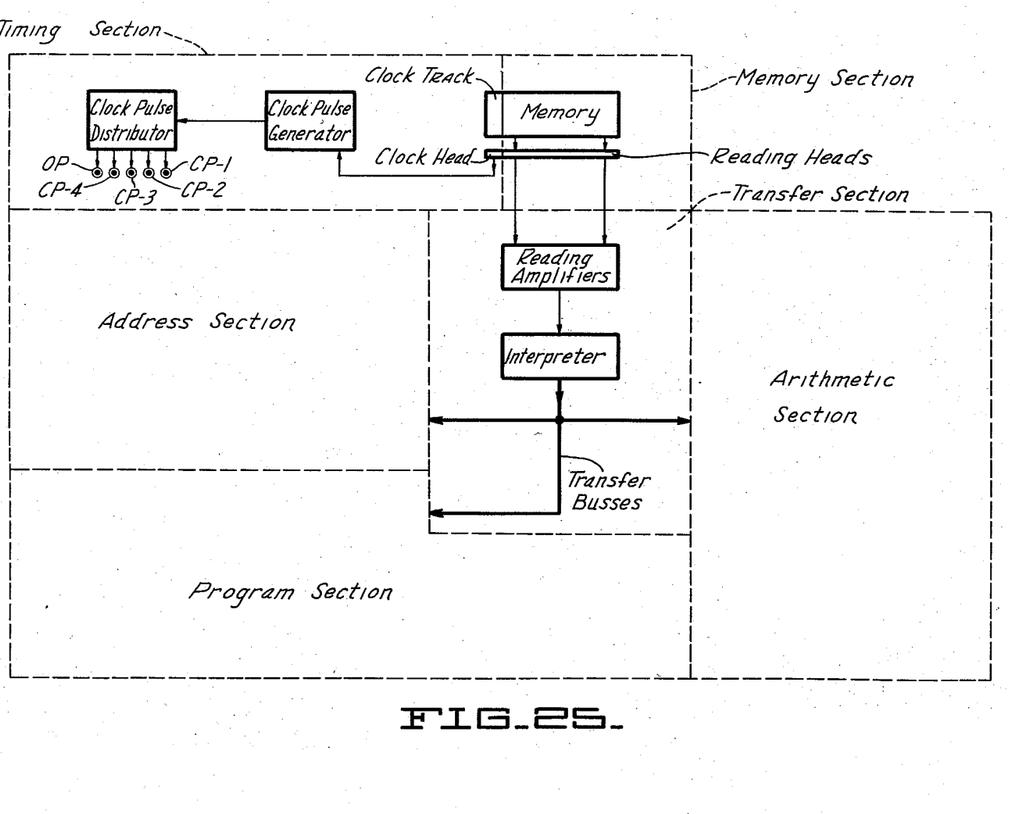
Fig. 25 is an overall block diagram of the computer.

Referring to the overall block diagram of the computer, shown in Fig. 25, the Memory Section includes a continuously rotating Memory Drum 100. The Drum 100 has a continuous magnetizable surface which, due to the location of sixty-four transducing heads adjacent the Drum and spaced along its axis, may be regarded as having sixty-four circumferential "Information Bands" spaced along the drum axis. Each Information Band cooperates with a respective Reading Head 110(0) to 110(63) for receiving writing signals from and transmitting reading signals to the Transfer Section, hereinafter described. Each Information Band is divided into sixty-four "sectors" which are spaced in the direction of drum rotation, and each sector is divided into thirty "cells" which also are spaced in the direction of drum rotation. A cell constitutes a unit storage area which can be magnetized with one polarity to represent a digit 0 or with the opposite polarity to represent a digit 1. The thirty cells in each sector correspond to a series of four CP's followed by a train of twenty-six OP's. Therefore, each sector is adapted to receive a sign digit followed by a twenty-six-digit word, and three of the thirty cells in each sector remain unused.

Each Information Band has a single gap in its otherwise continuous array of cells, and the gaps in all bands pass simultaneously under their related Reading Heads. The gaps constitute an index position of the Memory Drum from which the sectors in each Information Band are numbered.

*Timing section*

The Timing Section includes the previously-mentioned Clock Track, which is an auxiliary band on the Memory Drum 100. The Clock Track contains a number of cells equal to the total number of cells in each Information Band, viz., 64×30=1920 cells. The clock cells are evenly spaced along the Clock Track, and there is a single gap corresponding to the gap on each Information Band. The clock cells are permanently magnetized in a predetermined pattern, hereinafter described, and cooperate with an auxiliary transducing head 110(64), designated the "Clock Head," to energize the latter for producing a repetitive timing signal. The timing signal is transmitted to a Clock Pulse Generator 120 which generates a sharp "clock pulse" at the beginning of each digit interval and an "index pulse" during the single gap in the Clock Track cells. The clock pulses and index pulse are transmitted to a Clock Pulse Distributor 130, the output of which comprises a repetitive cycle of four CP's followed by a train of twenty-six OP's, for timing the computer operations.

*Transfer section*

The Transfer Section includes a respective Reading Amplifier 150(0) to 150(63) for cooperation with each of the Reading Heads 110(0) to 110(63). Each Reading Amplifier is repetitively energized by the signals stored in the related Memory band and amplifies these signals. Amplified reading signals are ordinarily blocked, but during a reading operation the reading signals from a selected Reading Amplifier 150(0) to 150(63) are gated to an Interpreter 200.

The Interpreter has two primary functions. First, the reading signals that it receives are of varying duration and amplitude. The Interpreter shapes these signals and times them with the proper clock pulses. The shaping and timing operation requires a period of two digit intervals; therefore, the output from the Interpreter is delayed by two digit intervals from the input. In order for the Interpreter output to be timed properly with the CP's and OP's, it is necessary for each of its input signals to be received two digit intervals prior to the generation of the related clock pulse. To accomplish this, all digits of a word written into Memory are written two digit intervals ahead of their related OP's, by means described in the previously-mentioned application Serial No. 458,473. Therefore, the first two digits of the word are written coincident with CP-3 and CP-4, respectively, the last twenty-four digits of the word are written coincident with the twenty-four OP's of the related train, and the last three cells in each Memory sector remain unused.

The second function of the Interpreter 200 is to change the form of the reading signal. It is recalled that a reading signal from Memory occurs only when there is a change in value from 0 to 1, or vice versa, as between two successive cells in a band. This form of signal is converted by the Interpreter into a second form wherein a discrete pulse represents each digit 0 to 1. The 0's and 1's pulses are transmitted by the Interpreter to the appropriate 0's or 1's Transfer Busses.

The remainder of the Transfer Section, as well as the entire Arithmetic, Address and Program Sections, is described in the previously-mentioned application Serial No. 458,473, and forms no part of the subject matter of the present invention.

MEMORY SECTION

*Memory drum*

Figure 26:
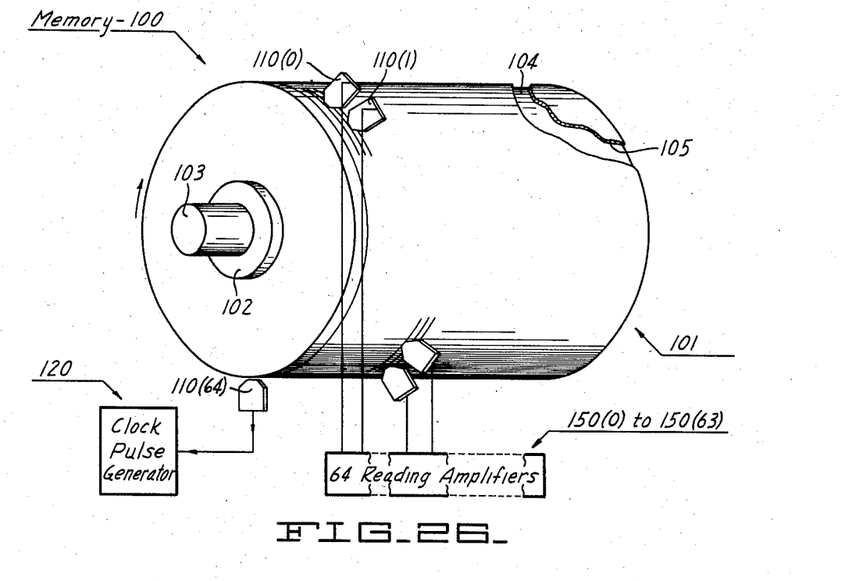
Fig. 26 is a schematic drawing of the Memory Drum.

The Memory, shown schematically in Fig. 26, comprises a drum 101 which is mounted by hubs such as 102 on a shaft 103, the shafts being driven by a motor (not shown). The drum comprises a main body 104 which may be formed of aluminum or other rigid material, and which is covered by a thin coating 105 of magnetizable material, such as magnetic iron oxide invested in a plastic base. An improved process for coating the drum is described and claimed in the copending application Serial No. 492,222, filed March 4, 1955, by Wayne E. Willis and George B. Greene.

The magnetizable drum surface may be considered as comprising sixty-five circumferential bands spaced along the drum axis, one band constituting the Clock Track and the remaining sixty-four bands constituting the Information Bands. As previously described, each band may be considered as comprising sixty-four substantially equal sectors spaced in the direction of drum rotation, with each sector divided into thirty cells also arranged in the direction of drum rotation. Each band, including the Clock Track, has a single gap in its otherwise continuous series of cells. The gaps in all bands simultaneously pass their related Reading Heads or Clock Head, and the sectors in each band may be conveniently counted by starting from the gap.

Each cell in the Information Bands may be magnetized to saturation in either of two opposite directions, thereby representing the respective binary digits 0 and 1. The entire Clock Track is permanently magnetized in a pattern representing alternate 0's and 1's, for reasons hereinafter described. The Clock Head 110(64) is located adjacent the path of the Clock Track and is energized by the magnetized pattern of the Clock Track for transmitting to the Clock Pulse Generator 120 (Fig. 35) a timing signal when the leading edge of each cell on the Clock Track passes the Clock Head 110(64) (Fig. 26). A respective Reading Head 110(0) to 110(63) cooperates with each Information Band on the drum and is connected to a respective Reading Amplifier 150(0) to 150(63).

*Reading heads*

Figure 27:
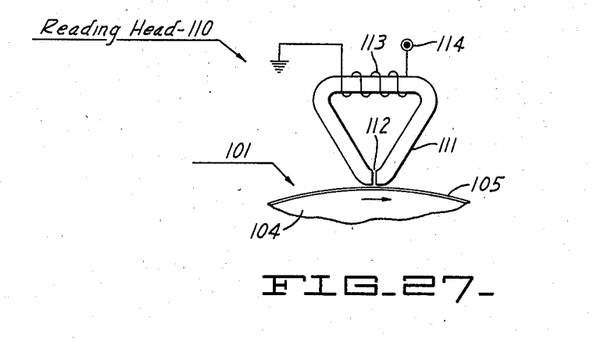
Fig. 27 is a schematic diagram of a typical transducing head.

A typical Reading Head 110 is shown in Fig. 27. The Head comprises a magnetic core 111 which is substantially triangular in shape and which has a gap 112 located at one corner of the triangle. A magnetizing coil 113 is wound on that leg of the core which is opposite gap 112. The coil 113 is grounded at one end and has an output terminal 114 at the other end which is connected to a related Reading Amplifier 150. The gap 112 is located adjacent the path of the related band of drum 101 (see also Fig. 26) for cooperation therewith. A particular cell transmits a reading signal only when it underlies gap 112. When there is a reversal in the direction of magnetization of the drum surface underlying gap 112, the change of flux induced in core 111 causes current to flow through winding 113 in a direction which is determined by the direction of change of magnetization of the magnetic medium.

An improved Reading Head, which may be employed in the present invention, is disclosed and claimed in the copending application Serial No. 297,441, filed July 7, 1952, by George B. Greene.

TIMING SECTION

Clock pulse generator

The Clock Pulse Generator receives timing signals from the Clock Head 110(64) (Fig. 26), and amplifies these signals to form clock pulses. The clock pulses are employed to generate an index signal which, together with the clock pulses, is transmitted to the Clock Pulse Distributor.

The timing signals from the Clock Head are received by the Clock Pulse Generator 120 (Fig. 28) at a terminal 121. Even though a substantially square wave (alternate 0's and 1's) is employed for writing the Clock Track, and therefore the signal output of the Clock Head would ideally be the derivative of a square wave, i.e., alternate positive and negative pulses, the resolution properties of most commercially avail Clock Heads are such that the clock signals received at terminal 121 may be substantially sinusoidal. The clock signals are transmitted through a two-stage amplifier 122 to the input of a Schmidt trigger 123. Trigger 123 may be of the type shown in Fig. 21, except that it has a transformer output impedance which differentiates the square wave output signals. The output from one transformer terminal of the Schmidt trigger is therefore a series of alternating positive and negative pulses, and the output from the other terminal of the transformer is a complementary series of alternating negative and positive pulses. Each of the two outputs from the Schmidt trigger 123 (Fig. 28) is transmitted through a respective diode 124 which is oriented to pass only positive pulses. The outputs of the two diodes 124 are joined, their combined signal output comprising a series of positive pulses. There are two output pulses from diodes 124 during each complete cycle of the timing signal from the Clock Head, i.e., one positive pulse corresponding to each cell of the Clock Track. The combined output of diodes 124 is amplified in a two-stage amplifier 125, the output pulses of amplifier 125 constituting the clock pulses which are employed in the present computer. The clock pulses from amplifier 125 are transmitted through a terminal 215 to the Interpreter (Fig. 25), and are also applied to the inputs of a pair of gates 135 and 136 (Fig. 28), hereinafter described.

The clock pulses from amplifier 125 are also transmitted through a pair of amplifiers 126 and 127, arranged in series. The input to amplifier 127 is connected to a source +C of positive grid bias potential through a capacitor 128 in parallel with a resistor 129. The positive clock pulses from the output of amplifier 125 are inverted by amplifier 126 and charge capacitor 128 negatively for maintaining amplifier 127 normally nonconducting. However, when the previously-described gap in the Clock Track passes the Clock Head, the generation of clock pulses is discontinued for a short time, and capacitor 128 discharges through resistor 129, thereby applying +C potential to the input grid of amplifier 127 and causing the latter to conduct. When the generation of clock pulses is recontinued, capacitor 128 is again charged negatively, and cuts off amplifier 127. The output from amplifier 127 is therefore a square negative pulse, hereinafter designated an "index" pulse, since it is generated once during each rotation of the Memory Drum and at a time when the latter is at an index position.

Clock pulse distributor

The index pulse from the output of amplifier 127 (Fig. 28) is transmitted through a diode 131(2) to the "set" input of a flip-flop 132(2), constituting the second stage of a five-stage binary counter which may be of the type shown in Fig. 24. The index pulse is also transmitted through each of a pair of diodes 131(4) and 131(5) (Fig. 28) to the respective "set" inputs of the fourth and fifth stage flip-flops 132(4) and 132(5) of the counter. Therefore, the index pulse sets the binary counter to the value 11010 which is equivalent to the decimal value "26." The previously mentioned gate 135, which is interrogated by the clock pulses from amplifier 125, is an "and" gate which is armed through a series of diodes 133(2), 133(4) and 133(5) by the concurrent 1 states of flip-flops 132(2), 132(4) and 132(5). Therefore, gate 135 is armed when the index pulse sets the second, fourth, and fifth stages of the counter to 1, and the first clock pulse which is generated following the index pulse is transmitted through gate 135.

The output of gate 135 is connected to the shift bus 140 of a five-stage shift register which may be of the type shown in Fig. 23. Each stage of the shift register comprises a respective flip-flop 142(1) to 142(5) (Fig. 28). The output of the last stage of the shift register is connected to the input of the first stage, so that any word standing in the shift register may be recirculated. The index pulse from the output of amplifier 127 is also transmitted through a diode 141(1) to the set input of shift register stage 142(1), and through a series of diodes 141(2) to 141(5) to the reset inputs of stages 142(2) to 142(5) of the shift register. Therefore, the index pulse enters the binary word 10000 into the shift register. The first clock pulse which is transmitted through gate 135 to shift bus 140, following the index pulse, shifts the digit 1 from stage 142(1) to 142(2), and each stage except stage 142(2) receives a 0 from its preceding stage. The 1 side output terminal of stage 142(1) is connected through an amplifier 144(1) and a phase inverter 145(1) to a pair of output terminals CP-1. When stage 142(1) is reversed from 1 to 0 in response to the first clock pulse following the index pulse, the voltage change of its 1 side output terminal is transmitted through amplifier 144(1) and phase inverter 145(1), and pulses of opposite polarity appear at the two output terminals CP-1. Therefore, the first clock pulse which follows each index pulse generates both a positive and a negative output pulse at terminals CP-1, and either of these pulses, depending upon the polarity desired, may be employed as CP-1.

The second clock pulse following the index pulse is also transmitted through gate 135 to shift bus 140, thereby causing the digit 1 standing in stage 142(2) to be shifted to stage 142(3), and the consequent voltage change in the 1 side output terminal of stage 142(2) generates the second control pulse CP-2 in the same manner as CP-1. Similarly, the third and fourth clock pulses, following each index pulse, are employed for shifting the digit 1 standing in stage 142(3) to stages 142(4) and 142(5), in turn, thereby generating third and fourth control pulses CP-3 and CP-4, respectively. The external use of control pulses CP-1 to CP-4 is described in the previously-mentioned application Serial No. 458,473.

CP-4 is transmitted through a lead 146 and a series of diodes 134(1) to 134(5) to the set input of counter stage 132(1) and to the reset inputs of the remaining counter stages 132(2) to 132(5). CP-4 thereby sets the counter to the value 00001, closing gate 135 to prevent subsequent clock pulses from being transmitted by that gate to the shift bus 140. Therefore, after the fourth clock pulse following each index pulse, the value 1 stands in stage 142(5) and is not shifted out of that stage by subsequent clock pulses.

The previously-mentioned gate 136, which is interrogated by each clock pulse from the output of amplifier 125, is armed by the 1 side of stage 142(5), and is therefore armed following the generation of CP-4. The output of gate 136 is connected through an amplifier 137 and a lead 138 to the symmetrical input of the first stage 132(1) in the binary counter. Therefore, after the first four clock pulses, following each index pulse, have been employed to generate control pulses, subsequent clock pulses are transmitted through gate 136, amplifier 137 and lead 138 to the symmetrical input of the first counter stage 132(1), the counter having been preset to the value 00001 as previously described. When twenty-five clock pulses have in this manner been introduced into the symmetrical input of stage 132(1), the counter stands at the value 11010 which, as previously described, causes the counter to arm gate 135. The twenty-sixth pulse which is entered into the counter advances its count to the binary equivalent of 27, and is also transmitted through gate 135 to shift bus 140, thereby shifting the digit 1 from stage 142(5) to stage 142(1); therefore, the next clock pulse initiates a new word interval by generating CP-1 in the manner previously described. When the digit 1 is shifted from stage 142(5) to stage 142(1), gate 136 is closed. It is noted, however, that gate 136 was armed during a period in which it transmitted twenty-six clock pulses to amplifier 137. The output of amplifier 137, in addition to being connected to the symmetrical input of counter stage 132(1), is also connected through a cathode follower 147 to an output terminal OP. Therefore, twenty-six pulses are transmitted to terminal OP during each word interval, and the train of twenty-six pulses are employed as operating pulses or "OP's." It is noted that although the index pulse is employed for initiating a first word interval by setting the counter to the binary value 11010, subsequent word intervals during rotation of the Memory Drum are initiated after each thirtieth clock pulse, in the absence of the index pulse, because the binary counter is automatically set to the value 11010 at the end of each word interval.

TRANSFER SECTION

Reading amplifiers

Figures 29, 30:
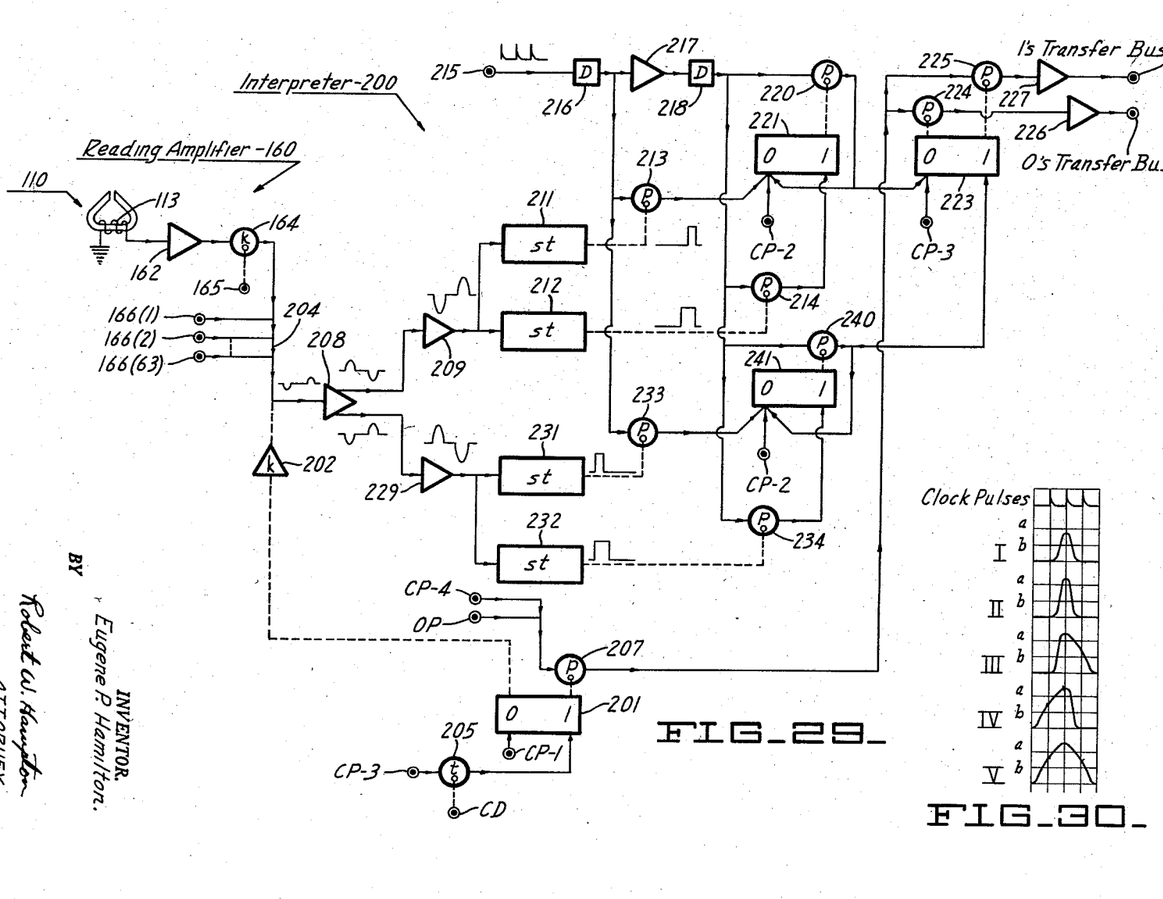
Fig. 29 is a schematic diagram of a typical Reading Amplifier and the Interpreter.
Fig. 30 is a diagram of certain wave forms in the Interpreter.

Each of the previously described Reading Heads 110(0) to 110(63) (Figs. 25 and 26) transmits its reading signals to a respective Reading Amplifier 150(0) to 150(63), an example of which is shown in Fig. 29. The output terminal 114 of the coil 113 of each Reading Head 110 is coupled from one end of winding 113 to the grid input of a class A triode amplifier 162. The output of amplifier 162 is coupled to the input of a cathode follower gate 164 which is normally closed. Gate 164 may be armed through its arming terminal 165 by the application of a suitable voltage to that terminal. This voltage may be applied, for example, when the proper memory band has been selected for reading, in the manner described in the previously-mentioned application Serial No. 458,473. When gate 164 is armed, the signals applied to its input from amplifier 162 are transmitted through its output and a lead 204 to an input of the Interpreter. Interpreter inputs from the other sixty-three Reading Amplifiers are indicated at 166(1) to 166(63) in Fig. 29.

Interpreter

It has been shown that a change from 0 to 1, or vice versa, as between successive digital values in a Memory band, is represented by a reversal of magnetic state from one region of saturation to the other. It has also been shown that the signal output from a Reading Head comprises the derivative of the written signal, i.e., a positive pulse when and only when there is a change from 0 to 1 as between the digits stored in two consecutive cells of the related Memory band, and a negative pulse when and only when there is a similar change from 1 to 0. However, it has been shown that words on the Transfer Busses appear in the form of one pulse for each digit 0 or 1, rather than one pulse for each change in value. The Interpreter is provided for receiving the first form of signals from Memory, and for converting them to equivalent signals of the second form for transmission to other circuits through the Transfer Busses.

If uniform signals are available from Memory, the converting process may be performed quite simply. Such uniform signals are available, for example, when the Memory band which is being read contains a regular pattern such as alternate 0's and 1's. However, each Information Band of Memory contains randomly arranged 0's and 1's, and it has been found that randomly arranged 0's and 1's result in aperiodic output pulses from a Reading Amplifier, positive pulses having the shapes shown in in Fig. 30 while negative pulses are similarly shaped but of opposite polarity. Each of the five pulses shown in Fig. 30 represents a change in the recorded value at a time corresponding to the center one of the three clock pulses shown. It will be seen that value pulses III, IV and V are of such duration that they might be mistaken as having occurred in coincidence with the first or third clock pulse, rather than the second clock pulse, thereby erroneously changing the value of the output word from Memory. Pulses II to V might be accurately interpreted by detecting only the top part of each pulse, i.e., only that part of the pulse which occurs entirely between the first and third clock pulses. It will be seen, however, that pulse I, which is a type that occurs at the output of a Reading Amplifier when the value in the related Memory band is alternating between 0's and 1's, is of relatively low amplitude and would not be detected at all if only the tops of the pulses were detected. Therefore, means must be provided for interpreting all of the possible shapes of output pulses from the Reading Amplifiers, and for converting them to uniform and properly timed pulses. The Interpreter 200, which is shown in Fig. 29, performs the necessary shaping and timing functions, as follows.

The terminal 166 from each Reading Amplifier 150(0) to 150(63) is connected through the previously-mentioned lead 204 to the input of the Interpreter 200. It is recalled that information signals are transmitted from the output of only one of the Reading Amplifiers 150(0) to 150(63) at a time, i.e., from the one Reading Amplifier which corresponds to the selected band of Memory. It is further recalled that when a band of Memory is selected, the normally closed cathode follower gate 164 of the related Reading Amplifier is armed. Therefore, the potential of the terminal 166 from one of the Reading Amplifiers is raised at the time the band is selected and tends to introduce a strong spurious signal into the Interpreter through lead 204 at this time. The spurious signal is prevented in the following manner. A read control flip-flop 201 normally stands at 0, each CP-1 being applied to its reset input. The 0 side output terminal of flip-flop 201 is connected to the input lead 204 through a cathode follower 202 which has a cathode impedance in common with all of the sixty-four cathode follower gates 164. Therefore, while flip-flop 201 stands at 0, lead 204 is always at a relatively high potential, and when a band is selected, thereby arming a cathode follower gate 164, there is substantially no potential rise on lead 204. After the band has been selected, and the related cathode follower gate 164 is armed, flip-flop 201 is set to 1 for cutting off cathode follower 202. Each CP-3 is applied to the input of a gate 205, the output of which is connected to the set input of flip-flop 201. Gate 205 is selectively armed during each reading operation, and the next CP-3 sets flip-flop 201 to 1. The arming terminal of gate 205 may be accomplished, for example, in the manner described in the previously-mentioned application Serial No. 458,473.

The input lead 204 of the Interpreter is connected to the input of a phase inverter 208. A typical read signal is shown at the input of phase inverter 208, and comprises a leading negative pulse and a trailing positive pulse. The negative pulse indicates a change from 0 to 1 of the digit value in the selected Memory band, and the positive pulse indicates a subsequent change from 1 to 0 of that value, one or more digits later. Although a change of digit value from 0 to 1 has previously been described as producing a positive pulse output from a Reading Head 110 (Fig. 27), amplifier 162 of each Reading Amplifier 150(0) to 150(63) (Fig. 29) inverts the reading signal, and cathode follower gate 164 does not re-invert the signal; therefore, a negative pulse at the input of the Interpreter indicates a change in digit value from 0 to 1.

The inverted output from phase inverter 208 is transmitted through an amplifier 209 which again inverts the signal to produce a positive pulse for each change in value from 1 to 0. The uninverted output from phase inverter 208 is transmitted through an amplifier 229 which inverts its input signal to produce a positive pulse output for each change in the band value from 0 to 1. The output of amplifier 209 is employed for controlling the transmission of pulses to the 0's Transfer Bus, and the output of amplifier 229 is employed for controlling the transmission of pulses to the 1's Transfer Bus. The circuit for transmitting pulses to the 0's Transfer Bus is substantially identical to the circuit for transmitting pulses to the 1's Transfer Bus, and only the former will be described in detail.

The output of amplifier 209 is connected to the inputs of two Schmidt triggers 211 and 212. Trigger 211 is biased to respond to only that portion of each positive input pulse which has an amplitude higher than lines $a$ in Fig. 30, while trigger 212 (see also Fig. 29) is biased to respond to that portion of each positive pulse lying above lines $b$ in Fig. 30. Therefore, if a positive input pulse is higher in amplitude than line $a$, trigger 211 produces a positive output pulse having a width equal to the width of that portion of the input pulse which lies above line $a$. Trigger 212 produces a positive square output pulse having a width equal to the width of each positive input pulse at line $b$. The pulse output from trigger 211 arms a gate 213, and the pulse output from trigger 212 arms a gate 214.

Clock pulses are received from output terminal 215 of the Clock Pulse Generator 120 (Fig. 28), and are transmitted through a delay line 216 (Fig. 29) to the input of gate 213. It is desirable for each clock pulse to interrogate gate 213 at substantially the middle of each output pulse from trigger 211. To accomplish this, there must be taken into consideration an inherent delay of each reading signal in the Reading Amplifiers 150 (see also Fig. 25) and in the input section of the Interpreter. Therefore, delay line 216 is provided for delaying each clock pulse long enough to make it coincide substantially with the center of the corresponding output pulse from trigger 211.

The output of delay line 216 is also transmitted through an amplifier 217 and a delay line 218, the purpose of which will be hereinafter described, to the input of gate 214 and to the input of a gate 220 which is controlled by the 1 side of a flip-flop 221. Flip-flop 221 normally stands at 0, each CP-2 being applied to its reset input. The output of gate 213 is connected to the reset input of flip-flop 221, and the output of gate 214 is connected to the set input of flip-flop 221. The output of gate 220 is connected to the reset input of flip-flop 221 and to the reset input of a flip-flop 223 which normally stands at 0, each CP-3 being applied to its reset input. Gates 213 and 214 and flip-flop 221 are employed for selecting the one clock pulse corresponding to the center of each information pulse which represents a change in band value from 1 to 0. Gate 220 is employed for transmitting the succeeding clock pulse to the reset input of flip-flop 223, which then controls the transmission of succeeding OP's to the 0's Transfer Bus until the band value changes from 0 to 1.

It is recalled that the input signals to the Interpreter are delayed part of a digit interval by the Reading Amplifiers, so that each input signal to the Interpreter is part of a digit interval behind its corresponding clock pulse. An additional delay of a full digit interval occurs in the Interpreter before flip-flop 223 is reset to 0 as described above. Therefore, reset pulses applied to flip-flop 223 are delayed more than one, and less than two digit intervals. By employing OP's for reading out flip-flop 223, as described above, the reading signals are delayed exactly two digit intervals, and the word pulse transmission to the 0's Transfer Bus is two full digit intervals behind the corresponding clock pulses. To compensate for this delay, words are written in Memory two full digit intervals ahead of their corresponding clock pulses, in a manner hereinafter described; therefore, the output from the Interpreter 200 is correctly timed with the OP trains from the Clock Pulse Distributor 130 (Fig. 28).

The 1 side output terminal of the previously-described read control flip-flop 201 (Fig. 29) arms a gate 207. Each CP-4 (which is synchronous with the sign digit pulse on the 1's Transfer Bus) and each train of OP's are applied to the input of gate 207, the output of which is connected to the inputs of a pair of gates 224 and 225. Gate 224 is armed by the 0 side of flip-flop 223 and has its output connected through an amplifier 226 to the 0's Transfer Bus. Gate 225 is armed by the 1 side of flip-flop 223 and has its output connected through an amplifier 227 to the 1's Transfer Bus.

The operation of the 0's section of the Interpreter will be described with reference to the five possible shapes of pulses which may be applied to the inputs of Schmidt triggers 211 and 212. Information pulse I (Fig. 30) is a thin pulse of low amplitude. Therefore, trigger 211 (see also Fig. 29) does not respond to this pulse, but trigger 212 does respond and produces a square output pulse which arms gate 214, gate 213 remaining closed. The clock pulse preceding the center of the information pulse, hereinafter referred to as the "first" of the three clock pulses related to each information pulse is blocked by gates 213, 214 and 220. The second clock pulse, i.e., that clock pulse which is substantially coincident with the center of the information pulse, is transmitted through the armed gate 214 for setting flip-flop 221 to 1, thereby arming gate 220. Although flip-flop 221 is set to 1 by the second clock pulse, arming gate 220, the flip-flop requires a definite time for switching; therefore, the second clock pulse is blocked by gate 220. The third clock pulse is transmitted through that gate, resetting flip-flop 221 to 0 for closing gate 220, and resetting flip-flop 223 to 0 if the latter does not already stand at 0. Therefore, subsequent OP's from the output of gate 207 are transmitted through gate 224 and amplifier 226 to the 0's Transfer Bus until flip-flop 223 is set to 1 in a manner hereinafter described.

Information pulse II is of short duration and high amplitude, and energizes both Schmidt triggers 211 and 212, thereby arming gates 213 and 214. However, neither of these gates is armed at the time it receives the first of the three related clock pulses, and that clock pulse is blocked by both gates 213 and 214 and by gate 220. The second clock pulse is first transmitted through gate 213 to the reset input of flip-flop 221 which, however, already stands at 0. The second clock pulse is delayed by delay line 218 and then transmitted through gate 214 for setting flip-flop 221 to 1 and arming gate 220. By the time the third clock pulse is applied to gates 213 and 214, both of these gates are closed. However, the third clock pulse is transmitted through gate 220, resetting flip-flop 221 to 0 for closing gate 220, and resetting flip-flop 223 to 0 if the latter is not already reset. Thereafter, OP's from the output of gate 207 are transmitted through gate 224 and amplifier 226 to the 0's Transfer Bus until such time as flip-flop 223 is set to 1.

Information pulse III is of long duration and high amplitude. It rises above both potential levels b and a after the first and before the second clock pulse, then falls below bevel a between the second and third clock pulses, and finally falls below level b after the third clock pulse. Therefore, pulse III energizes Schmidt trigger 211 to produce an output pulse having a width which encompasses only the second of the three clock pulses, and energizes Schmidt trigger 212 to produce an output pulse having a width which encompasses both the second and third clock pulses. The first of the three related clock pulses is blocked by gates 213, 214 and 220. The second clock pulse is transmitted through gate 213 to the reset input of flip-flop 221 which, however, already stands at 0. The second clock pulse is thereafter transmitted through gate 214 to the set input of flip-flop 221, thereby setting the latter to 1 and arming gate 220. The second clock pulse is blocked by gate 220 due to the inherent switching time of flip-flop 221. The third clock pulse is blocked by gate 213, but is transmitted through gate 220 to the reset inputs of flip-flops 221 and 223, as hereinbefore described. The third clock pulse is also transmitted through gate 214 to the set input of flip-flop 221. The pulses simultaneously applied to the reset and set inputs of flip-flop 221 operate as a symmetrical input and reverse flip-flop 221 to its 0 state, thereby closing gate 220. Subsequent OP's from gate 207 are thereafter transmitted through gate 224 and amplifier 226 to the 0's Transfer Bus until such time as flip-flop 223 is set to 1.

Information pulse IV is also of long duration and high amplitude. It rises to potential level b before the first of the three related clock pulses, then rises above level a before the second clock pulse, and finally falls below both levels a and b before the third clock pulse. Information pulse IV therefore energizes Schmidt trigger 211 to produce an output pulse having a width which encompasses only the second clock pulse, and energizes Schmidt trigger 212 for producing an output pulse having a width which encompasses both the first and second clock pulses. The first clock pulse is blocked by gates 213 and 220, but is transmitted through gate 214, setting flip-flop 221 to its 1 state for arming gate 220. The second clock pulse is transmitted through gate 213, resetting flip-flop 221 to 0 for closing gate 220. The second clock pulse is also transmitted through gate 214 for setting flip-flop 221 back to 1 and arming gate 220. Delay line 218 causes sufficient time to elapse after application of the pulse from gate 214 to the set input of flip-flop 221 and before application of the pulse from gate 213 to the reset input of flip-flop 221 for permitting the latter to be completely reset to 0 before the second clock pulse interrogates gate 220. Therefore, although the second clock pulse is transmitted through gate 214 for setting flip-flop 221 to 1, that clock pulse is blocked by gate 220 due to the inherent switching time of flip-flop 221. The third clock pulse is blocked by both gates 213 and 214, but is transmitted through gate 220 to the reset input of flip-flop 221, thereby closing gate 220. The output pulse from gate 220 is also transmitted to the reset input of flip-flop 223, causing subsequent OP's to be transmitted to the 0's Transfer Bus in the manner hereinbefore described.

Information pulse V is of long duration and high amplitude. It rises above potential level b prior to the first of the three related clock pulses, then rises above level a prior to the second clock pulse, then falls below level a prior to the third clock pulse, and finally falls below level b subsequent to the third clock pulse. Information pulse V therefore energizes Schmidt trigger 211 to produce an output pulse having a width which encompasses only the second of the three related clock pulses, and energizes Schmidt trigger 212 for producing an output pulse which has a width encompassing all three of the related clock pulses. The first clock pulse is blocked by gates 213 and 220, but is transmitted through gate 214, setting flip-flop 221 to 1 for arming gate 220. The second clock pulse is transmitted through gate 213 for resetting flip-flop 221 to 0. The second clock pulse, after passing through delay line 218, is blocked by gate 220, but is transmitted through gate 214, setting flip-flop 221 to 1 and arming gate 220. The third clock pulse is blocked by gate 213 but is transmitted simultaneously through gates 214 and 220 to apply both a set and a reset pulse to flip-flop 221, thereby reversing the latter to 0 in the manner hereinbefore described. The pulse output from gate 220 also resets flip-flop 223 to 0; therefore, subsequent OP's are transmitted to the 0's Transfer Bus until such time as flip-flop 223 is set to 1.

Flip-flop 223 is set to 1 in response to each pulse from the Reading Amplifiers which signifies a change in the band value from 0 to 1. The circuit for setting flip-flop 223 to 1 is substantially identical to the circuit previously described for resetting that flip-flop to 0, and includes a pair of Schmidt triggers 231 and 232 which are biased, respectively, to respond to that part of an information pulse which lies above potential levels a and b. The output of the previously described amplifier 229 is connected to the inputs of both Schmidt triggers 231 and 232, it being recalled that the output of amplifier 229 is a positive pulse for each information signal indicating a change from 0 to 1 of the band digit. The clock pulse output from delay line 216 is applied to a gate 233 which is armed by the output of trigger 231, and the output of delay line 218 is applied to the input of a gate 234 which is armed by the output of trigger 232. The output of gate 233 is connected to the reset input of a flip-flop 241 and the output of gate 234 is connected to the set input of flip-flop 241. Each CP-2 is applied to the reset input of flip-flop 241, thereby maintaining the latter normally reset to 0. The clock pulse output from delay line 218 is also applied to the input of a gate 240 which is armed by the 1 side output terminal of flip-flop 241. The output of gate 240 is connected to the reset input of flip-flop 241 and to the set input of flip-flop 223. Each information pulse representing a change from 0 to 1 of the band digit is operated upon by triggers 231 and 232, flip-flop 241, and gates 233, 234 and 240 in the manner hereinbefore described, and sets flip-flop 223 to 1; therefore, subsequent OP's from the output of gate 207 are transmitted through gate 225 and amplifier 227 to the 1's Transfer Bus until the next change in the value of the band digit causes flip-flop 223 to be reset to 0.

In summary, the Interpreter identifies the proper time position of each information pulse and then employs that pulse for controlling the transmission of subsequent 0's or 1's pulses to the Memory Busses until a next information pulse is received. Briefly, the time position of each information pulse is identified by detecting the amplitude of the pulse during each digit interval embraced by the pulse. If the pulse has more than a predetermined amplitude during a first digit interval, its timing is conditionally identified with the clock pulse occurring during that digit interval. If the information pulse is subsequently found to have more than a second and higher predetermined amplitude during a second digit interval, the first identification is ignored, and the pulse is re-identified with the next clock pulse. If the information pulse does not have the higher minimum amplitude during the second digit interval, the first identification is retained. It will be seen that the above principle of multiple sampling of a signal can be extended to testing for "n" minimum amplitudes during a corresponding "n" successive digit intervals, and ultimately identifying the timing of the information pulse with the clock pulse occurring during the digit interval in which the greatest amplitude is detected.

I claim.

1. In a computer having means for generating timing signals, a memory unit with information signals stored therein in random distribution, and reading means co-operating with said generating means and said memory unit to sense the stored signals in timed relation to the generation of said timing signals, the combination of: an output circuit; a normally closed output circuit gate having an input; means for transmitting timing signals from said generating means to the input of said gate; means for arming said gate, said arming means comprising; means connected to said reading means and responsive to the reading of an information signal of more than a first predetermined amplitude to generate and energizing signal; a conditioning circuit operable after a predetermined delay interval following energization of said conditioning circuit for arming said gate; means including said energizing signal generating circuit for energizing said conditioning circuit in response to the generation of said energizing signal; means for testing the amplitude of said information signal to detect the occurrence of a second predetermined signal amplitude greater than said first predetermined signal amptitude; means for de-energizing said conditioning circuit in response to the detection of said second predetermined signal amplitude; and means operable in response to the detection of said second predetermined signal amplitude for re-energizing said de-energized conditioning circuit after a time delay related to the time separation of two consecutive ones of said timing signals.

2. In a computer having means for generating timing signals, a memory unit with information signals stored therein in random distribution, and reading means co-operating with said generating means and said memory unit to sense the stored signals in timed relation to the generation of said timing signals, the combination of: an output circuit; a normally open output circuit gate having an input; means for transmitting timing signals from said generating means to the input of said gate; and means for disarming said gate, said disarming means comprising: disarming signal generating means connected to said reading means and responsive to the reading of an information signal of more than a first predetermined amplitude to generate a de-energizing signal; a conditioning circuit connected to said disarming signal generating means for disarming said gate after a predetermined delay interval following energization of said conditioning circuit; means connected to said de-energizing signal generating means for energizing said conditioning circuit in response to the generation of said de-energizing signal; testing means connected to said reading means for testing the amplitude of said information signal to detect the occurrence of second predetermined signal ampltiude greater than said first predetermined signal amplitude greater than said first predetermined signal amplitude; means connected to said testing means for de-energizing said conditioning circuit in response to the detection of said second predetermined signal amplitude; and means operable in response to detection of said second predetermined signal ampltiude for re-energizing said conditioning circuit after a time delay related to the time separation of two consecutive ones of said timing signals.

3. In a readout system for an information storage including a source of timing signals and a source of aperiodic information signals, the combination of: information signal amplitude measuring means; means for applying said information signals to said signal measuring means in a timed relation to said timing signals; an output circuit having an enabled and a disabled state; means connected to said measuring means for changing the state of said output circuit in response to the detection by said measuring means of a first predetermined minimum amplitude of an information signal; and means connected to said measuring means for delaying the changing of the output circuit state for a time interval corresponding to the readout time of a single character of stored information, said delaying means being operable in response to the subsequent detection by said measuring means of a second predetermined minimum amplitude of said information signal greater than said first amplitude.

4. In a readout system for an information storage including a source of timing signals and a source of aperiodic information signals, the combination of: means for measuring a first predetermined minimum amplitude of said information signals; means for measuring a second predetermined minimum amplitude of said information signals, said second predetermined minimum being of greater amplitude than said first predetermined minimum; means for applying said information signals to said measuring means in a timed relation to said timing signals whereby the time interval between a predetermined number of timing signals corresponds to the readout time of a single character of stored information; an output circuit having an enabled state and a disabled state; output circuit gating means connected to said measuring means for changing the state of said output circuit in response to the detection by said first amplitude measuring means of said first amplitude of an information signal; and gate inhibiting means connected to said measuring means for postponing the operation of said gating means for the readout time of a single character of stored information only if said second amplitude is detected during the information readout interval immediately succeeding that during which said first minimum signal amplitude is detected.

5. In a circuit for synchronizing information signals with timing signals, the combination of: a timing signal source; a time delay circuit connected to said timing signal source; an information signal source; an output circuit; an output gate having an input connected to said time delay circuit and an output connected to said output circuit for passing a select one of said timing signals to correspond to each information signal; a bistable device having an enabling state and a disabling state of operation; a connection to an arming terminal of said output gate from an enabling output of said bistable device; a first conditioning gate with an input connected to said time delay circuit and an output connected to an enabling input of said bistable device for controlling the passage of timing signals to said enabling input; a first amplitude discriminator having an input connected to said source of information signals and an output connected to the arming terminal of said first conditioning gate for arming said first conditioning gate to pass the timing signal occurring during each interval that an information signal is above a first predetermined amplitude; a second conditioning gate with an input connected to said source of timing signals and an output connected to a disabling input of said bistable device; and a second amplitude discriminator with an input connected to said source of information signals and with an output connected to an arming terminal of said second conditioning gate for arming said second gate to pass a timing signal to the disabling input of said bistable device, prior to conduction of said timing signal through said time delay circuit, for triggering said bistable device to its disabling state to thereby disable said output gate at the beginning of the interval that an information signal is above a second predetermined amplitude greater than said first predetermined amplitude.

6. In a system for synchronizing information signals with timing signals, the combination of: an input circuit for receiving said information signals; an output circuit; timing signal gating means for transmitting to said output circuit a select one of said timing signals to correspond to each of said information signals; and means for arming said timing signal gating means during a third one of three timing signal intervals to pass said select one of said timing signals comprising: means connected to said input circuit for enabling said timing signal gating means in response to an information signal having a first voltage amplitude above a first predetermined amplitude during said first timing signal interval, means connected to said input circuit for disabling and then enabling said timing signal gating means in response to an information signal having a second voltage amplitude above a second predetermined amplitude greater than said first amplitude during a second timing signal interval, and means for transmitting said select timing signal to said output circuit through said enabled timing signal gating means during a third timing signal interval.

7. In a circuit for supplying timed information signals according to a recorded flux pattern on a magnetic medium, the combination of: a source of operating signals; a first transfer bus; a second transfer bus; a first output gate connected to said source of operating signals for passing operating signals to said first transfer bus during the intervals that a flux pattern corresponding to a given representation is being read; a second output gate connected to said source of operating signals for passing operating signals to said second transfer bus during the intervals that a flux pattern corresponding to another representation is being read; an output circuit bistable device having a first and a second state of operation corresponding respectively to said given representation and said other representation and with a first output connected to an arming terminal of said first output gate and with a second output connected to an arming terminal of said second output gate for arming said gates according to the state of said bistable circuit; a source of timing signals; a time delay circuit connected to said source; a first control gate connected to said time delay circuit for passing select ones of said timing signals to a first input of said bistable device for setting the device to said first state of operation; a second control gate connected to said time delay circuit for passing select ones of said timing signals to a second input of said bistable device for setting the device to said second state of operation; a first bistable control device having first and second inputs and with an output connected to an arming terminal of said first control gate; a second bistable control device having first and second inputs and with an output connected to an arming terminal of said second control gate; a first conditioning gate with an input connected to the output of said time delay circuit and an output connected to said first input of said first bistable control device; a second conditioning gate with an input connected to the output of said time delay circuit and an output connected to said first input of said second bistable control device; a reading transducer for transducing said flux patterns on said medium to respective negative and positive electric signals corresponding respectively to said given representation and said other representation; a phase inverter coupled to said reading transducer for supplying at a first phase inverter output a positive signal corresponding to each negative signal from said transducer and for supplying at a second phase inverter output a positive signal corresponding to each positive signal from said transducer; a first lower voltage amplitude discriminator with an input connected to said first phase inverter output and with an output connected to the arming terminal of said first conditioning gate for arming said first conditioning gate to pass the timing signals occurring during the period that a signal corresponding to said given representation is above a first predetermined voltage amplitude; a second lower voltage amplitude discriminator with an input connected to said second phase inverter output and with an output connected to the arming terminal of said second conditioning gate for arming said second conditioning gate to pass the timing signals occurring during the period that a signal corresponding to said other representation is above a first predetermined voltage amplitude; a third conditioning gate having an input connected to said timing signal source and an output connected to said second input of said first bistable control device; a fourth conditioning gate having an input connected to said timing signal source and an output connected to said second input of said second bistable control device; a first upper voltage amplitude discriminator with an input connected to said first phase inverter output and with an output connected to the arming terminal of said third conditioning gate for selectively arming said third conditioning gate to pass a timing signal to said second input of said first bistable control device prior to conduction of the timing signal through said time delay circuit for setting the first bistable control device to said second state of operation to thereby disable said first output control gate at the beginning of an interval that a signal corresponding to said given representation is above a second predetermined voltage amplitude greater than said first predetermined voltage amplitude; a second upper voltage amplitude discriminator with an input connected to said first phase inverter output and with an output connected to the arming terminal of said fourth conditioning gate for selectively arming said fourth conditioning gate to pass a timing signal to said second input of said second bistable control device prior to conduction of the timing signal through said time delay circuit for setting said second bistable control device to said second state of operation to thereby disable said second output control gate at the beginning of an interval that a signal corresponding to said other representation is above a second predetermined voltage amplitude greater than said first predetermined voltage amplitude.

8. In a circuit for supplying timed output signals according to a recorded flux pattern on a magnetic medium, the combination of: means for transducing said flux patterns to corresponding first and second polarity input signals; an input circuit for receiving said input signals; a source of operating signals; a source of timing signals; a gated output circuit; a first output terminal corresponding to said first polarity input signals; first control means for enabling said gated output circuit to pass operating signals to said first output terminal in response to a first polarity input signal, said first control means comprising first timing signal gating means, first control means for arming and disarming said first timing signal gating means, means connected to said input circuit for setting said control means to disarm said gating means at the beginning of a first timing signal interval to prevent passage of a first timing signal to said gated output circuit in response to a signal amplitude of said input signal above a first predetermined level, means connected to said input circuit for setting said control means to arm said gating means after a time delay from the beginning of said first timing signal interval in response to a signal amplitude of said input signal above a second predetermined level less than said first level, and means for transmitting a timing signal to said output circuit through said enabled timing signal gating means during a second timing signal interval to set said gated output circuit to pass operating signals to the output terminal corresponding to the first polarity input signal; a second output terminal corresponding to said second polarity input signals; and second control means for enabling said gated output circuit to pass operating signals to said second output terminal in response to a second polarity input signal, said second control means comprising a second timing signal gating means, second control means for arming and disarming said second gating means, means connected to said input circuit for setting said control means to disarm said second gating means at the beginning of a first timing signal interval to prevent passage of a first timing signal to said gated output circuit in response to a signal amplitude of said second input signal above a first predetermined level, means connected to said input circuit for setting said second control means to arm said second gating means after a time delay from the beginning of said first timing signal interval in response to a signal amplitude of said input signal above a second predetermined level less than said first level, and means for transmitting a timing signal to said output circuit through said enabled timing signal gating means during a second timing signal interval to set said gated output circuit to pass operating signals to the output terminal corresponding to the second polarity input signal.

References Cited in the file of this patent

UNITED STATES PATENTS 2,820,895    Johnstone _____________ Jan. 21, 1958

FOREIGN PATENTS 743,416    Great Britain ___________ Jan. 18, 1956